United States Patent [19]

Letoffé

[11] 3,933,729

[45] Jan. 20, 1976

[54] ORGANOPOLYSILOXANE COMPOSITIONS WHICH VULCANISE AT AMBIENT TEMPERATURE AND ABOVE TO YIELD ELASTOMERS WHICH ADHERE TO THE MOST DIVERSE SUPPORTS

[75] Inventor: Michel Letoffé, Ste-Foy-les-Lyon, France

[73] Assignee: Rhone-Poulenc S.A., Paris, France

[22] Filed: May 10, 1974

[21] Appl. No.: 468,871

[30] Foreign Application Priority Data

May 11, 1973 France .............................. 73.17157

[52] U.S. Cl. ............................ 260/37 SB; 260/825
[51] Int. Cl.² ........................................ C08L 83/00
[58] Field of Search ........................ 260/825, 37 SB

[56] References Cited
UNITED STATES PATENTS

| | | | |
|---|---|---|---|
| 3,057,469 | 10/1962 | Bond et al. .................... | 260/825 X |
| 3,527,659 | 9/1970 | Keil ............................... | 260/825 X |
| 3,758,441 | 9/1973 | Nitzsche et al. ............... | 260/825 X |

*Primary Examiner*—Lewis T. Jacobs
*Attorney, Agent, or Firm*—Stevens, Davis, Miller & Mosher

[57] ABSTRACT

The properties of organosilicon compositions based on α-ω-dihydroxy diorganopolysiloxanes, methyl polysiloxanes, fillers, amino organosilicon corss linking agents and optionally alkyl silicates or polysilicates, which are vulcanisable at ambient temperature or above, are improved by using a methylpolysiloxane in which the ratio of the $R(CH_3)_2SiO_{0.5}$ units ($R=C_1-C_3$ alkyl or vinyl) to $SiO_2$ units is 0.4:1 to 1.2:1 and which contains 0.5 – 3.5% by weight OH groups bonded to Si and by using an amino organosilicon compound which is an aminoorganosilane of the general formula (i) $(R''O)_{3-p}R'_pSi[(CH_2)_nO]_m(CH_2)_tNHQ$ in which R' represents an alkyl group with 1 to 4 carbon atoms, a vinyl group or a phenyl group, R'' represents a methyl, ethyl or methoxyethyl radical, Q represents a hydrogen atom or the radical $—(CH_2)_2NH_2$, p and m represent 0 or 1, n represents 1, 2, 3 or 4, and t represents 2 or 3, or an aminoorganopolysiloxane produced by reacting the aminoorganosilane (i) above, in which p is 0, with a hydroxylic methylpolysiloxane polymer (ii) containing at least 2% by weight of hydroxyl groups bonded to the silicon atoms, of viscosity 1 cPo at 25°C to 1,000 cPo at 25°C, of the average general formula $(CH_3)_a(HO)_bSiO_{(4-a-b)/2}$ in which $a$ represents any number from 1.6 to 2.3 and $b$ represents any number ranging from 0.1 to 1; the amounts of aminoorganosilane (i) and hydroxylic methylpolysiloxane polymer (ii) being such that there are 0.4 to 1.2 mols of (i) per gram-(hydroxyl group) (that is to say 17 g) of (ii). The new compositions have improved fluidity characteristics and pot life, and adhere easily to most surfaces without using a primer and can be used particularly to protect electronic connections.

6 Claims, No Drawings

ORGANOPOLYSILOXANE COMPOSITIONS WHICH VULCANISE AT AMBIENT TEMPERATURE AND ABOVE TO YIELD ELASTOMERS WHICH ADHERE TO THE MOST DIVERSE SUPPORTS

The present invention relates to organopolysiloxane compositions which vulcanise at ambient temperature and above to yield elastomers which adhere, without the aid of an adhesion primer, to the most diverse substrates, for example to metals, to plastics, to wood, to masonry, to ceramics, to glass and to woven and non-woven fibrous materials.

Over the last fifteen years, numerous patents have been published which relate to organopolysiloxane compositions which cure at ambient temperature and above as well as to the elastomers resulting therefrom. Amongst these compositions, some offer the advantage of adhering, after cross-linking to form elastomers, to diverse substrates; such compositions are mentioned in particular in French Pat. Nos. 2,074,144 and 2,076,539, Japanese application Nos. 7,014,196 and 7,111,272, Belgian Pat. No. 774,830, U.S. Pat. No. 3,686,357, and German application No. 2,034,727.

However, these compositions possess certain disadvantages which restrict their use in important fields of application such as the coating of delicate electronic devices, the manufacture of moulds for the reproduction of patterns with a complicated surface, and the jointing of materials situated in a vertical position. These disadvantages are, for example:

a lack of fluidity which prevents the compositions from penetrating between all surface details of the articles to be protected or to be reproduced;

flow of the jointings produced in a vertical position; and a pot life which is too short, that is to say a premature crosslinking during the application operations, which leads to a loss of products or to poor adhesion to the substrate to be protected or to be jointed.

We have now found that it is possible to reduce or even overcome these disadvantages in compositions of this type.

The present invention provides an organopolysiloxane composition which vulcanises at ambient temperature and above and comprises the following ingredients: (parts are expressed by weight)

A. 100 parts of an $\alpha,\omega$-dihydroxydiorganopolysiloxane polymer, of viscosity 500 cPo at 25°C to 1 million cPo at 25°C, in which the organic radicals bonded to the silicon atoms, which may be the same or different, each is an alkyl radical with 1 to 3 carbon atoms, a halogenoalkyl radical with 3 or 4 carbon atoms, a vinyl radical, an aryl radical with 6 to 8 carbon atoms, a halogenoaryl radical with 6 or 7 carbon atoms or a cyanoalkyl radical with 3 or 4 carbon atoms; at least 60% of these organic radicals being methyl radicals;

B. 10 to 50 parts preferably 15–45 parts of a methylpolysiloxane resin consisting of units of the formulae $R(CH_3)_2SiO_{0.5}$ and units of formula $SiO_2$, wherein R represents an alkyl radical with 1 to 3 carbon atoms or a vinyl radical, and the value of the ratio of the number of $R(CH_3)_2SiO_{0.5}$ units to the number of $SiO_2$ units is 0.4:1 to 1.2:1, preferably 0.58:1 to 0.69:1, these polymers containing at least 0.5% but not more than 3.5% and preferably 1.1–2.2% by weight of hydroxyl groups bonded to the silicon atoms, C. 10 to 70 parts of a filler;

D. 0.5 to 15 parts preferably 1–13 parts of an aminoorganosilicon compound which is an aminoorganosilane of the general formula (i) $(R''O)_{3-p}R'_pSi[(CH_2)_nO]_m(CH_2)_tNHO$ in which R' represents an alkyl group with 1 to 4 carbon atoms, a vinyl group or a phenyl group, R'' represents a methyl, ethyl or methoxyethyl radical, O represents a hydrogen atom or the radical $-(CH_2)_2NH_2$, $p$ and $m$ represent 0 or 1, $n$ represents 1,2,3 or 4 and $t$ represents 2 or 3, or an aminoorganopoly-siloxane produced by reacting the aminoorganosilane (i) above, in which $p$ is 0 with a hydroxylic methylpolysilane polymer (ii) containing at least 2% by weight of hydroxyl groups bonded to the silicon atoms, of viscosity 1 cPo at 25°C to 1,000 cPo at 25°C, of the average general formula $(CH_3)_a(HO)_bSiO_{(4-a-b)/2}$ in which $a$ represents any number from 1.6 to 2.3 and $b$ represents any number ranging from 0.1 to 1; the amounts of aminoorganosilane (i) and hydroxylic methylpolysiloxane polymer (ii) being such that there are 0.4 to 1.2 mols of (i) per gram-(hydroxyl group) (that is to say 17 g) of (ii); and, E. 0 to 10 parts of an alkyl silicate and/or alkyl polysilicate in which the alkyl radical has 1 to 3 carbon atoms.

The $\alpha$-$\omega$-dihydroxydiorganopolysiloxane polymers A, used for the preparation of the compositions of the invention, have, as already mentioned, a viscosity of 500 to 1 million cPo at 25°C, and preferably 800 to 500,000 cPo at 25°C, and consist mainly of diorganosiloxy units, but the presence of other units such as monoorganosiloxy units, in the proportion of at most 2% by number, is not precluded.

Examples of organic radicals bonded to the silicon atoms of these polymers, include:

alkyl with 1 to 3 carbon atoms, such as methyl, ethyl and propyl radicals, halogenoalkyl with 3 or 4 carbon atoms, such as 3,3,3-trifluoro-propyl and 4,4,4-trifluoro-butyl radicals, aryl with 6 to 8 carbon atoms, such as phenyl, tolyl and xylyl radicals, halogenoaryl with 6 to 7 carbon atoms, such as chlorophenyl, dichlorophenyl, trichlorophenyl, tetrachlorophenyl and trifluoromethylphenyl radicals, and cyanoalkyl with 3 to 4 carbon atoms, such as beta-cyanoethyl and gamma-cyanopropyl radicals.

The methyl radicals represent at least 60%, and preferably 75%, of all these organic radicals.

Various techniques exist for the preparation of these polymers A, but those which have proved satisfactory in industry are generally used, for example, the polymerisation of diorganocyclopolysiloxanes by means of a catalytic amount of an alkaline or acid agent followed by treatment of the polymerised products with calculated amounts of water (French Pat. Nos. 1,134,005 and 1,198,749); they can also be obtained from silicone manufacturers.

Conventional fillers C are employed to impart acceptable mechanical properties to the elastomers resulting from the curing of the compositions of the invention; the fillers are introduced, as stated above, at the rate of 10 to 70 parts, and preferably 20 to 60 parts, per 100 parts of polymers A and can be chosen from amongst: inorganic products, such as pyrogenic silica, precipitated silica, diatomaceous silica, ground quartz, aluminium silicates, mixed aluminium magnesium silicates, zirconium silicate, mica powder, calcium carbonate, glass powder and glass fibres, titanium oxides of the pyrogenic oxide and rutile type, barium zirconate, barium sulphate, barium metaborate, boron nitride, lithopone, iron oxides, zinc oxide, aluminium oxide, zirconium oxide, magnesium oxide, graphite, conducting or non-conducting lampblacks, asbestos and calcined clay, and organic products, such as phthalocyanins, cork powder, sawdust, synthetic fibres and synthetic polymers (polytetrafluoroethylene, polyethylene, polypropylene, polystyrene and poylvinyl chloride).

These fillers, and more especially the fillers of inorganic origin, can optionally be surface-modified by treatment with the organosilicon compounds usually employed for this purpose such as diorganocyclopolysiloxanes, hexaorganodisiloxanes, hexamethyldisilazane and diorganocyclopolysilazanes (French Pat. Nos. 1,136,884, 1,136,885 and 1,236,505 and British Pat. No. 1,024,234). These fillers thus modified contain, in the majority of cases, 3 to 30% of their weight of organosilicon compounds.

In addition to the fillers, adjuvants can be introduced such as inorganic or organic pigments and organo-silicon polymers. The latter, which act as plasticisers, stabilisers, thixotropic agents or agents which facilitate the extrusion of the compositions, are used at the rate of at most 70 parts, and preferably at most 60 parts, per 100 parts of polymers A. Examples of suitable organosilicon polymers include:

α,ω-bis-(triorganosiloxy)-diorganopolysiloxane polymers of viscosity at least 10 cPo at 25°C, consisting mainly of diorganosiloxy units and of at most 1% of monoorganosiloxy units, the organic radicals bonded to the silicon atoms being chosen from amongst methyl, vinyl and phenyl radicals, at least 60% of these organic radicals being methyl radicals. The viscosity of these polymers can be as much as $2 \times 10^6$ to $10 \times 10^6$ cPo at 25°C, and they thus comprise oils with a fluid to viscous appearance and soft to hard gums. They are prepared in accordance with the usual techniques described more precisely in French Patents Nos. 978,058, 1,025,150 and 1,108,764;

liquid, branched methylpolysiloxane polymers, with 1.6 to 1.99 organic groups per silicon atom, consisting of units of the formulae $(CH_3)_3SiO_{0.5}$, $(CH_3)_2SiO$ and $CH_3SiO_{1.5}$ and containing 0.3 to 6% of hydroxyl groups. They can be produced by hydrolysis of the corresponding chlorosilanes, as shown in French Patent No. 1,408,662; and diorganopolysiloxane oils blocked by hydroxyl and/or lower alkoxy groups, of low viscosity generally within the range of 2 to 2,000 cPo at 25°C, the organic radicals bonded to the silicon atoms being, as above, chosen from amongst methyl, vinyl and phenyl radicals, at least 40% of these organic radicals being methyl radicals; methoxy, ethoxy, isopropoxy, propoxy, butoxy, isobutoxy and tertiary butoxy groups may be mentioned as chain-blocking lower alkoxy groups. These oils are also prepared in accordance with the usual techniques described more precisely in French Patents Nos. 938,292, 1,014,674, 1,116,196, 1,278,281 and 1,276,619.

The alkyl silicates and/or polysilicates E used, as mentioned above, at the rate of at most 10 parts, and preferably of at most 7 parts, per 100 parts of polymers A serve mainly to lower the viscosity of the compositions of the invention and, in certain cases, to facilitate their curing and their adhesion.

The alkyl silicates can be chosen from amongst methyl silicate, ethyl silicate, isopropyl silicate and n-propyl silicate, and the polysilicates can be chosen from amongst the products resulting from the partial hydrolysis of these silicates; they are polymers consisting of a high proportion of units of the formula $(R^4O)_2SiO$ and of a low proportion of units of the formula $(R^4O)_3SiO_{0.5}$, $R^4OSiO_{1.5}$ and $SiO_2$, the symbol $R^4$ representing methyl, ethyl, isopropyl or n-propyl radicals. Their silica content is usually taken as a basis for characterising them, and is measured by carrying out a determination on the product resulting from the complete hydrolysis of a sample.

The methods for their preparation are well known and appear in particular in the work "Chemistry and Technology of Silicones" by W. Noll, on pages 648 to 659. In order that these polymers shall be compatible and/or shall react with the other ingredients employed for the preparation of the compositions of the invention, they must be able to dissolve in the usual hydrocarbon solvents such as toluene, xylene and methylcyclohexane, in the proportion of at least 50 parts of polymers per 100 parts of solvents.

The methylpolysiloxane resins B which, together with the aminoorganosilicon compounds D, characterise the invention are used at the rate of 10 to 50 parts, and preferably 15 to 45 parts, per 100 parts of polymers A. They consist, as already indicated, of units of the formulae $R(CH_3)_2SiO_{0.5}$ and $SiO_2$; methyl, ethyl, isopropyl and n-propyl radicals may be mentioned by way of illustration of alkyl radicals with 1 to 3 carbon atoms represented by the symbol R. These resins are prepared easily from triorganohalogenosilanes and/or hexaorganodisiloxanes and sodium silicate in accordance with the process mentioned in French Patent No. 1,046,736, or from alkyl silicates and triorganohalogenosilanes in accordance with the process mentioned in French Patent No. 1,134,005. The reaction is carried out in inert diluents and the resins thus prepared are stored in these diluents the latter are replaced solely or partially by other diluents which are also inert. Toluene, xylene, cyclohexane, methylcyclohexane and chlorobenzene may be mentioned as suitable diluents. The solutions obtained generally contain 30 to 75% by weight of resins.

As already mentioned, these resins contain 0.5 to 3.5% by weight of hydroxyl groups bonded to the silicon atoms; however, it is not always easy to obtain exactly the desired proportion of hydroxyl groups and this is more especially the case when a relatively low proportion is desired, for example about 0.8%–1.2%; thus, in this case, it is advantageous to treat methylpolysiloxane resins with a higher proportion of hydroxyl groups with compounds which provide $R(CH_3)_2SiO_{0.5}$ units such as trimethylchlorosilane, dimethylchlorosilane, dimethylpropylchlorosilane, trimethylacetoxysilane, trimethylbenzoxysilane, hexamethyldisilazane and dimethylvinylsilylamine; the acid or the ammonia formed is then removed. Such a process is mentioned in particular in French Patent No. 1,526,681. By seeking a particular value for the proportion of hydroxyl groups, it is possible to impart to the compositions of the invention certain desired physical characteristics, for example, very great fluidity or, in contrast, the start of gelling; this value also determines the amount of aminoorganosilicon cross-linking agents D and silicate esters E used.

The aminoorganosilicon compounds D, the other ingredients which characterise the invention, and which are used at the rate of 0.5 to 15 parts and preferably 1 to 13 parts, comprise, as already mentioned:

aminoorganosilanes of the general formula $(R''O)_{3-p}R'_pSi[CH_2)_nO]_m(CH_2)_tNHQ$; methyl, ethyl, propyl, isopropyl, n-butyl and sec.-butyl radicals may be mentioned by way of alkyl radicals with 1 to 4 carbon atoms represented by the symbol R'.

More precisely, these aminoorganosilanes can correspond to the following formulae:
$(CH_3O)_3Si(CH_2)_3NH(CH_2)_2NH_2$; $(CH_3OCH_2CH_2O)_3Si(CH_2)_3NH(CH_2)_2NH_2$; $(C_2H_5O)_3Si(CH_2)_3NH_2$; $(CH_3OCH_2CH_2O)_3Si(CH_2)_3NH_2$; $(C_2H_5O)_3Si(CH_2)_3O(CH_2)_3NH_2$; $(C_2H_5O)_2C_6H_5Si(CH_2)_3O(CH_2)_3NH_2$; $(C_2H_5O)_3SiCH_2O(CH_2)_2NH_2$; $(C_2H_5O)_3Si(CH_2)_3O(CH_2)_2NH_2$; and $(C_2H_5O)_2CH_3Si(CH_2)_3NH_2$.

These silanes are well known and their preparation is described, for example, in French Patents Nos. 1,140,301, 1,217,009 and 1,365,095 and in the First Addition 92,367 to French Patent No. 1,474,784; and aminoorganopolysiloxanes resulting from the reaction of the aminooganosilanes (i) of the general formula
$(R''O)_3Si[(CH_2)_nO]_m(CH_2)_tNHQ$
with hydroxylic methylpolysiloxanes (ii) used at the rate of 0.4 to 1.2 mols of (i) per gram-(hydroxyl group) of (ii).

By way of example, those silanes corresponding to the above formulae in which 3 alkoxy or methoxyethoxy groups are bonded to the silicon atoms are suitable as silanes (i).

The hydroxylic polymers (ii), may be oils of the formula $HO[Si(CH_3)_2O]_yH$ in which the symbol $y$ represents any number ranging from 2 to 22, or resins with a $CH_3/Si$ ratio greater than or equal to 1.6, containing at least 2% by weight of hydroxyl groups, consisting of units chosen mainly from amongst those of the formulae $(CH_3)_3SiO_{0.5}$, $(CH_3)_2SiO$ and $CH_3SiO_{1.5}$. They are prepared in accordance with customary techniques (French Patent No. 1,077,220) by cohydrolysis of chlorosilanes or acetoxysilanes. Thus mixtures formed from suitable molar quantities of dimethyldichlorosilane, trimethylchlorosilane and methyltrichlorosilane or of dimethyldichlorosilane and methyltrichlorosilane or of methyltrichlorosilane and trimethylchlorosilane can be cohydrolysed, it being possible for the methylchlorosilanes to be replaced wholly or partially by methylacetoxysilanes.

The reagents (i) and (ii) are heated, preferably in a solvent medium, at a sufficiently high temperature and for a sufficient period of time to remove the expected amount of alkanol formed by the reaction: $-Si(OR'')_3 +HOSi\leqq \rightarrow Si(OR'')_2OSi\leqq +R''OH$. This results in the formation of copolymers which possess simultaneously, in addition to methyl groups, methoxy, ethoxy or methoxyethoxy groups and aminoorganic groups. Such copolymers are mentioned, for example, in French Patents Nos. 1,381,590 and 1,385,693.

In order to prepare the compositions of the invention, it is recommended, in a first step, to heat the mixture formed from the α,ω-dihydroxydiorganopolysiloxane polymers A, the solutions of methylpolysiloxane resins B, the fillers C and optionally adjuvants in a suitable apparatus. This heating, which is advantageously carried out under a pressure below atmospheric pressure and at a temperature below 200°C, for a period of time ranging from 15 minutes to several hours, makes it possible to remove the solvents for the resins, the polymers of rather low molecular weight and the traces of water. It is not always necessary to heat the fillers C, particularly when they are very dry and homogeneous, with the polymers A and the resins B; they can be incorporated into the devolatilised mixture of the constituents A and B afterwards.

In a second step, the aminoorganosilicon compounds D and, where appropriate, the silicates and/or polysilicates E are then added; this addition does not require any special precautions and can be carried out in the atmosphere, given that the crosslinking reaction begins as soon as the constituents A, B and D are brought into contact; in order to facilitate this crosslinking, it is furthermore advisable to add to the compositions of the invention at most 0.1% of their weight of water.

Due to the simultaneous adjustment of the proportion of hydroxyl groups in the resins B and of the amounts of crosslinking agent D, the compositions can initially possess a whole range of viscosities and thicknesses. They can be very fluid with viscosities of the order of 10,000 cPo at 25°C and thus pour readily, or they can be partially gelled and do not pour, or they can have an intermediate physical state.

The time during which they can be employed or their pot life, that is to say the period of time during which the compositions are still plastic, is greater than 10 minutes and can, if necessary, be as much as several hours.

These compositions are generally non-sticky to the touch after a few hours at ambient temperature, but this period of time can be 30 minutes or even less by using methylpolysiloxane resins B with a high proportion of hydroxyl groups, for example of the order of 2%, optionally combined with silicates and/or polysilicates E. If the resins B have a low proportion of hydroxyl groups, the presence of metal or organometallic salts of carboxylic acids, used at the rate of at most 0.5% of the weight of the compositions of the invention, also makes it possible to achieve very short "non-sticky" time intervals. Amongst these salts, tin octoate, iron octoate, lead octoate, dibutyl-tin diacetate and dibutyl-tin dilaurate may be especially mentioned.

If the compositions are not to be used immediately, they are stored in 2 parts: one containing the polymers A, the resins B, the fillers C and, where appropriate, the various adjuvants, and the other containing the crosslinking agents D and, where appropriate, the silicates E; according to a variant, the fillers C and the various adjuvants can be mixed wholly or partially with the crosslinking agents D and the silicates E. This packaging of the compositions in 2 parts is not necessarily a disadvantage compared with one-part compositions because the 2 parts can be mixed and then applied by means of machines equipped with metering pumps and mixing heads, such machines being already employed, inter alia, for dispensing composite mixtures [such as plastisols and foaming compositions based on polyurethanes] on conveyor belts.

The compositions of the invention can be employed in many fields, such as:

the gluing of the most diverse materials such as metals, wood, masonry, ceramics, plastics, glass, laminates of glass fabrics and organic resins, organic and synthetic rubbers, asbestos and woven or non-woven products based on inorganic, organic or synthetic fibres, the manufacture of moulds for the reproduction of sculptured articles of complicated shape such as period furniture and the dashboards of motor vehicles, the protection of electronic and electro-technical connections, and jointing for vehicle windscreens, double glazing and sanitary installations.

The following examples illustrate the invention (in the remainder of the text, the parts are expressed by weight):

EXAMPLE 1

A composition which can be cured at ambient temperature is prepared by mixing the following ingredients:

100 parts of an α,ω-dihydroxydimethylpolysiloxane oil of viscosity 3,000 cPo at 25°C;

50 parts of a 60% strength by weight solution of a methylpolysiloxane resin in xylene.

This resin consists of $(CH_3)_3SiO_{0.5}$ and $SiO_2$ units distributed respectively in the numerical ratio 0.69/1; it contains 1.1% hydroxyl groups bonded to the silicon atoms and originates, as indicated below, from a resin which is similar but has a higher proportion of hydroxyl groups;

40 parts of a diatomaceous silica of average particle diameter 10 microns;

1.5 parts of a polyethyl silicate containing 40% by weight of silica;

1.9 parts of n-propyl silicate; and 1.7 parts of a polyaminoalkylsilane of the formula $NH_2(CH_2)_2NH(CH_2)_3Si(OCH_3)_3$.

The α,ω-dihydroxydimethylpolysiloxane oil, the solution of the methylpolysiloxane resin and the diatomaceous silica are first introduced into a suitable container equipped with a stirrer and a device for removing the volatile products.

The mixture resulting therefrom is heated and stirred under a pressure below atmospheric pressure, which stabilises at 25 mm Hg when the temperatures of the mixture reaches 110°C. The mixture is then stirred for 1 hour at this temperature and pressure; all the volatile products, mainly xylene and traces of water, are removed and then the product is allowed to cool to ambient temperature in the presence of a gentle stream of dry nitrogen. The residual product pours readily and has a viscosity of approximately 20,000 cPo at 25°C.

The liquid mixture consisting of the 3 remaining ingredients, namely the polyethyl silicate, the n-propyl silicate and the polyaminoalkylsilane, is then added thereto. The whole is stirred vigorously for 5 minutes.

A portion of the homogeneous composition obtained, the initial viscosity of which is of the order of 16,000 cPo. at 25°C, is spread in air (temperature 25°C and relative humidity 50%) on polyethylene plates which have been rendered non-stick by depositing a thin film of a mould-release agent. After 24 hours, the layers deposited, of thickness approximately 2 mm, have changed gradually into rubbery films. These films are detached and their mechanical properties, and more precisely the following properties, are measured at various stages of ageing in the atmosphere:

Shore hardness in accordance with ASTM Standard Specification D 676-59 T, and tensile strength in kg/cm² and corresponding elongation in % in accordance with AFNOR Standard Specification T 46,002, the test pieces used for the measurements being of the dumb-bell H 3 type.

The results of the measurements are given in Table I.

TABLE I

| Age of the film | Shore hardness | Tensile strength in kg/cm² | Corresponding elongation in % |
|---|---|---|---|
| 48 hours | 26 | 14 | 285 |
| 7 days | 32 | 18 | 260 |
| 30 days | 35 | 21 | 250 |
| 60 days | 35 | 22 | 250 |

Furthermore, the remaining portion of the composition is used to prepare test pieces with diverse materials, in accordance with ASA Standard Specification 116-1, 1960. These test pieces each consist of 2 plates of one and the same material, placed opposite one another, of square shape and of dimensions 50 × 50 mm, spaced 12.5 mm apart, joined longitudinally at their centre by the product to be examined which has the shape of a parallelepiped with a square base of dimensions 50 × 12.5 × 12.5 mm; in the present case, the product to be examined is the elastomer resulting from the curing of the composition in air.

Using a tensometer, for the purpose of evaluating the adhesive force of the elastomer to these materials and following the instructions given in the abovementioned ASA standard specification, the tensile strength in kg/cm² and the corresponding elongation in % of test pieces prepared 15 days before and left exposed to the atmosphere for this period are then measured.

The results of the measurements are given in Table II.

TABLE II

| | Tensile strength in kg/cm² | Corresponding elongation in % |
|---|---|---|
| Aluminium | 5 | 105 |
| Steel | 6 | 130 |
| Copper | 5 | 120 |
| Brass | 5.5 | 110 |
| Glass | 7 | 140 |
| Asbestos | 8 | 130 |
| Polyethylene terephthalate | 5 | 100 |
| Laminate of glass fabric and phenolic resin | 7 | 150 |
| Laminate of glass fabric and epoxy resin | 7 | 140 |
| Polyethylene | 5 | 110 |
| Cold-vulcanised elastomer, prepared according to Ex. 2 of French Patent 1,198,749 | 6 | 120 |
| Polyvinyl chloride | 5 | 110 |

By way of comparison, a composition is prepared which is similar to that which has just been described except that the 50 parts of the solution of the methylpolysiloxane resin are dispensed with. This composition is spread, as indicated above, on polyethylene plates. The rubbery films formed are detached after 24 hours and their mechanical properties are measured; after exposure to the atmosphere for 7 days, the following results are found: Shore hardness 29, tensile strength in kg/cm² 12, and corresponding elongation in % 160. These values are those of an elastomer of very average quality.

The methylpolysiloxane resin containing 1.1% by weight of hydroxyl groups is prepared from a sililar resin formed from the same $(CH_3)_3SiO_{0.5}$ and SiO units, but distributed respectively in the numerical ratio of 0.61/1 and containing 2.2% by weight of hydroxyl groups.

The procedure below is followed:

2,330 parts of a 60% strength solution in xylene of the resin containing 2.2% by weight of hydroxyl groups and 42 parts of trimethylchlorosilane are heated at 90°C for 3 hours. The mixture is allowed to cool to about 60°C and 14 parts of water and 14 parts of isopropanol are added; the mixture is heated to the reflux temperature and the water and hydrochloric acid formed are removed by entrainment by the xylene vapours. When the temperature of the mixture reaches 135°C, it is allowed to cool to about 60°C, 70 g of water are added and the mixture is again heated under reflux until the water and the residual hydrochloric acid have been completely removed.

EXAMPLE II

5 Compositions which can be cured at ambient temperature are used, each being prepared from the following ingredients:

100 parts of an α,ω-dihydroxydimethylpolysiloxane oil of viscosity 3,000 cPo at 25°C, 50 parts of the 60% strength by weight solution in xylene of the methylpolysiloxaneresin, used in Example I, 40 parts of diatomaceous silica of average particle diameter 10 microns, 0.5 part of polyethyl silicate containing 40% by weight of silica, 3 parts of n-propyl silicate and x parts of an aminoorganosilicon compound.

The procedure used to prepare each composition is as described in Example I, and then a portion of each of the 5 compositions obtained, the initial viscosity of which ranges from 15,000 to 25,000 cPo at 25°C, is spread in air on polyethylene plates which have been treated beforehand with a non-stick agent. The films cured on these supports are detached and left to stand exposed to the atmosphere for 8 days, and their properties are measured.

The results of these measurements are given in Table III below, in which the nature of the aminoorganosilicon compound used and the quantities introduced are also given:

TABLE III

| Aminoorganosilicon compound used | Quantities introduced (x parts) | Shore hardness | Mechanical properties | |
|---|---|---|---|---|
| | | | Tensile strength in kg/cm² | Corresponding elongation in % |
| H₂NCH₂CH₂NH(CH₂)₃Si(OCH₃)₃ | 1.7 | 24 | 17 | 330 |
| H₂N(CH₂)₃Si(OC₂H₅)₃ | 1.7 | 20 | 12 | 380 |
| H₂N(CH₂)₃SiCH₃(OC₂H₅)₂ | 1.6 | 20 | 13 | 310 |
| H₂N(CH₂)₃O(CH₂)₃Si(OC₂H₅)₃ | 2.1 | 25 | 18 | 330 |
| H₂N(CH₂)₃O(CH₂)₃SiC₆H₅(OC₂H₅)₂ | 2.4 | 26 | 19 | 340 |

The other remaining portion of each of the 5 compositions is spread in the form of a layer approximately 2 mm thick on copper and glass plates, previously degreased by means of trichloroethylene. It is found, after exposure to the atmosphere for a period of 48 hours, by simply scraping with the fingernail, that the elastomer formed adheres strongly to the copper and to the glass, and moreover the copper does not show any trace of corrosion.

EXAMPLE III

A composition is prepared by mixing the following ingredients:

100 parts of an α,ω-dihydroxydimethylpolysiloxane oil of viscosity 2,000 cPo at 25°C, 40 parts of a 60% strength solution in xylene of a methylpolysiloxane resin. This resin consists of (CH₃)₃SiO₀.₅ and SiO₂ units distributed respectively in the numerical ratio 0.58/1, and contains 1.2% by weight of hydroxyl groups bonded to the silicon atoms, 50 parts of calcium carbonate of average particle diameter 3μ, 1.8 parts of a polyethyl silicate containing 40% by weight of silica, 1 part of n-propyl silicate and 1.7 parts of a polyaminoalkylsilane of the formula NH₂(CH₂)₂NH(CH₂)₃Si(OCH₃)₃.

The mixture of the α,ω-dihydroxydimethylpolysiloxane oil and the solution of methylpolysiloxane resin is introduced into a rotary evaporator and the whole is heated gradually to 100°C and under a pressure of less than 1 bar, so as to remove the volatile materials. When the temperature of 100°C is reached, the pressure settles at about 20 mm of mercury, and heating is continued at this temperature and at this pressure for 1 hour. The residual product obtained is then mixed at ambient temperature with calcium carbonate. After obtaining a homogeneous liquid of viscosity approximately 15,000 cPo at 25°C, the other ingredients (polyethyl silicate, n-propyl silicate and polyaminoalkylsilane) are then added.

The procedure indicated in Example I is followed in order to measure the mechanical properties of the elastomers derived from the composition thus formed; the composition is spread in the atmosphere on polyethylene plates which have been rendered non-stick, and then, after 24 hours, the cured films are detached. After being left exposed to the atmosphere for 7 days, they have a Shore hardness of 29, a tensile strength of 27 kg/cm² and a corresponding elongation of 400%.

EXAMPLE IV

2 Compositions G1 and G2 which can be cured at ambient temperature are used, each being prepared from the following ingredients:

100 parts of an α,ω-dihydroxydimethylpolysiloxane oil of viscosity 5,000 cPo at 25°C, 20 parts in the case of G1 and 30 parts in the case of G2 of a 60% strength solution in methylcyclohexane of a methylpolysiloxane resin. This resin consists of (CH₃)₃SiO₀.₅,

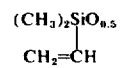

and SiO₂ units distributed respectively in the numerical ratio 2.3/0.5/3.5, and contains 1.2% by weight of hydroxyl groups bonded to the silicon atoms, 40 parts of a diatomaceous silica of average particle diameter 3 microns, 2 part (only in the case of G2) of an α,ω-bis-(trimethylsiloxy)-dimethylpolysiloxane oil viscosity 1,000 cPo at 25°C and 1.7 parts of the polyaminoalkylsilane of the formula H₂N(CH₂)₂NH(CH₂)₃Si(OCH₃)₃.

Each of the compositions G1 and G2 is prepared in accordance with the process described in Example I; G1 has an initial viscosity of 15,000 cPo at 25°C and G2 has an initial viscosity of 22,000 cPo at 25°C. Test pieces, the plates of which are steel or aluminium, are then manufactured with these 2 compositions and in accordance with ASA Standard Specification 116-1, 1960.

The tensile strength in kg/cm$^2$ and the corresponding elongation in % of the test pieces prepared 15 days before and left exposed to the atmosphere for this entire period are measured in accordance with the above-mentioned ASA standard specification. The results are given in Table IV.

TABLE IV

| Elastomer derived from the composition | Steel | | Aluminium | |
|---|---|---|---|---|
| | Tensile strength in kg/cm$^2$ | Corresponding elongation in % | Tensile strength in kg/cm$^2$ | Corresponding elongation in % |
| G1 | 5.5 | 150 | 4.7 | 130 |
| G2 | 3.1 | 300 | 3.1 | 270 |

EXAMPLE V

2 Compositions H1 and H2 which can be cured are used, each being prepared from the following ingredients: 100 parts of an $\alpha,\omega$-dihydroxydimethylpolysiloxane oil of viscosity 10,000 cPo at 25°C, 50 parts of a 60% strength solution in xylene of a methylpolysiloxane resin; this resin consists of units of the formulae $(CH_3)_3SiO_{0.5}$ and $SiO_2$, distributed respectively in the numerical ratio 0.65/1, and contains 2.2% by weight of hydroxyl groups bonded to the silicon atoms, 40 parts of a diatomaceous silica of average particle diameter 10 microns, 2 parts in the case of H1 and 3.5 parts in the case of H2 of a polyethyl silicate containing 40% by weight of silica, 1.5 parts (only in the case of H1) of n-propyl silicate and 11 parts of a polysiloxane, the preparation of whichh is described below, carrying $(CH_2)_3NH(CH_2)_2NH_2$ groups and methoxy groups attached to the silicon atoms.

The procedure mentioned in Example I is followed in order to prepare these compositions H1 and H2, the mixture consisting of the polyethyl silicate, the n-propyl silicate (only in the case of H1) and the polysiloxane with polyaminoalkyl and mexthoxy groups being added to the residual product resulting from the devolatilisation of the mixture comprising the diatomaceous silica, the $\alpha,\omega$-dihydroxydimethylpolysiloxane oil and the solution of resin. These compositions are plastic and partially gelled, and do not pour.

A portion of each of these compositions H1 and H2 is spread, by means of a spatula, in a layer of thickness approximately 2 mm, in air, of polyethylene plates covered with a non-stick agent. After 24 hours, the rubbery films formed are detached and their mechanical properties are measured in accordance with the process which is also given in Example I. The results of the measurements, carried out on films which are 8 days old, are given in Table 5 below:

TABLE V

| | Shore hardness | Tensile strength in kg/cm$^2$ | Corresponding elongation in % |
|---|---|---|---|
| H1 | 46 | 29 | 180 |
| H2 | 57 | 29 | 140 |

The remaining portion of each of the compositions is spread in the form of a layer approximately 2 mm thick on glass, aluminium, steel and polyethylene plates, which have previously been degreased by means of trichloroethylene. It is found, after exposure to the atmosphere for a period of 48 hours, by simply scraping with the fingernail, that the elastomers formed adhere strongly to all these plates no matter what their nature may be.

In order to prepare the polysiloxane with polyaminoalkyl and methoxy groups, a solution comprising the following constituents is heated under reflux for 2 hours:

152 g of anhydrous cyclohexane,
450 g of the silane of the formula $NH_2(CH_2)_2NH(CH_2)_3Si(OCH_3)_3$ and
248 g of an $\alpha,\omega$-dihydroxydimethylpolysiloxane oil of viscosity 50 cPo at 25°C, containing 12% by weight of hydroxyl groups.

During refluxing, the methanol which forms is immediately entrained by azeotropic distillation. The cyclohexane is then removed by heating the mixture at about 70°C under a pressure of less than 1 bar which stabilises at 20 mm of mercury when the bulk of the cyclohexane is removed. A liquid residual product of viscosity 40 cPo at 25°C remains.

I claim:

1. An organopolysiloxane composition vulcanisable at ambient temperature and above, comprising in parts by weight:
    A. 100 parts of an $\alpha,\omega$-dihydroxydiorganopolysiloxane polymer, of viscosity 500 cPo at 25°C to 1 million cPo at 25°C, in which the organic radicals bonded to the silicon atoms, which may be the same or different, each is an alkyl radical with 1 to 3 carbon atoms, a hologenoalkyl radical with 3 or 4 carbon atoms, a vinyl radical, an aryl radical with 6 to 8 carbon atoms, a halogenoaryl radical with 6 or 7 carbon atoms or a cyanoalkyl radical with 3 or 4 carbon atoms; at least 60% of these organic radicals being methyl radicals;
    B. 10 to 50 parts of a methylpolysiloxane resin consisting of units of the formulae $R(CH_3)_2SiO_{0.5}$ and units of formula $SiO_2$, wherein R represents an alkyl radical with 1 to 3 carbon atoms or a vinyl radical, and the value of the ratio of the number of $R(CH_3)_2SiO_{0.5}$ units to the number of $SiO_2$ units is 0.4:1 to 1.2:1, these polymers containing at least 0.5% but not more than 3.5% by weight of hydroxyl groups bonded to the silicon atoms,
    C. 10 to 70 parts of a filler;
    D. 0.5 to 15 parts of an aminoorganosilicon compound which is an aminoorganosilane of the formula (i) $(R''O)_{3-p}R'_pSi[(CH_2)_nO]_m(CH_2)_tNHQ$ in which R' represents an alkyl group with 1 to 4 carbon atoms, a vinyl group or a phenyl group, R'' represents a methyl, ethyl or methoxyethyl radical, Q represents a hydrogen atom or the radical $-(CH_2)_2NH_2$, p and m represent 0 or 1, n represents 1, 2, 3 or 4, and t represents 2 or 3, or an aminoorganopolysiloxane produced by reacting the aminoorganosilane (i) above, in which p is 0, with a hydroxylic methylpolysiloxane polymer (ii) containing at least 2% by weight of hydroxyl groups bonded to the silicon atoms, or viscosity 1 cPo at 25°C to 1,000 cPo at 25°C, of the average general formula $(CH_3)_a(HO)_bSiO_{(4-a-b)}$ in which $a$ represents any number from 1.6 to 2.3 and $b$ represents any number ranging from 0.1 to 1; the amounts of aminoorganosilane (i) and hydroxylic methylpolysiloxane polymer (ii) being such that there are 0.4 and 1.2 mols of (i) per gram-(hydroxyl group) (that is to say 17g) of (ii); and, 0–10 parts of at least one compound selected from the group consisting of alkylsilicates and alkylpolysilicates in which the alkyl radical has 1–3 carbon atoms.

2. A composition according to claim 1, wherein component B is one in which the value of the ratio of the number of $(CH_3)_3SiO_{0.5}$ units to the number of $SiO_2$ units is 0.58:1 to 0.69:1 and the resin contains 1.1 to 2.2% by weight of hydroxyl groups bonded to the silicon atoms.

3. A composition according to claim 1 wherein component D is an aminoorganosilane of the formula:

$H_2NCH_2CH_2NH(CH_2)_3Si(OCH_3)_3$;

$H_2N(CH_2)_3Si(OC_2H_5)_3$;

$H_2N(CH_2)_3SiCH_3(OC_2H_5)_2$; $H_2N(CH_2)_3O(CH_2)_3Si(OC_2H_5)_3$ or $H_2N(CH_2)_3O(CH_2)_3SiC_6H_5(CO_2H_5)_2$.

4. A composition according to claim 1 wherein component C is an inorganic filler or an organic filler or a mixture thereof.

5. A process for the preparation of a composition as defined in claim 1 which comprises, in a first step, heating a mixture of component A, a solution of component B and optionally component C for a time sufficient to remove solvents, low molecular weight polymers and water to form a devolatilised mixture, adding component C to the devolatilised mixture if it has not already been introduced in the first step, and, in a second step, adding component D and component E to the devolatilised mixture, the proportions of the components being such that a composition according to claim 1 is obtained.

6. An elastomer obtained by curing at ambient temperature or above a composition according to claim 1.